US012623888B2

(12) United States Patent
Fujimoto et al.

(10) Patent No.: US 12,623,888 B2
(45) Date of Patent: May 12, 2026

(54) WORK MACHINE

(71) Applicant: TADANO LTD., Kagawa (JP)

(72) Inventors: Tsukasa Fujimoto, Kagawa (JP); Kenichi Nagakane, Kagawa (JP)

(73) Assignee: TADANO LTD., Kagawa (JP)

( * ) Notice: Subject to any disclaimer, the term of this patent is extended or adjusted under 35 U.S.C. 154(b) by 159 days.

(21) Appl. No.: 18/693,959

(22) PCT Filed: Oct. 4, 2022

(86) PCT No.: PCT/JP2022/037121
§ 371 (c)(1),
(2) Date: Mar. 21, 2024

(87) PCT Pub. No.: WO2023/058650
PCT Pub. Date: Apr. 13, 2023

(65) Prior Publication Data
US 2025/0145428 A1 May 8, 2025

(30) Foreign Application Priority Data
Oct. 6, 2021 (JP) ................................ 2021-164917

(51) Int. Cl.
*B66C 23/70* (2006.01)

(52) U.S. Cl.
CPC ................................. *B66C 23/708* (2013.01)

(58) Field of Classification Search
CPC ..... B66C 23/70; B66C 23/701; B66C 23/702; B66C 23/705; B66C 23/706;
(Continued)

(56) References Cited

U.S. PATENT DOCUMENTS 3,842,985 A * 10/1974 Svede .................. B66C 23/705 52/121
4,053,058 A * 10/1977 Jensen ................. B66C 23/708 212/298
(Continued)

FOREIGN PATENT DOCUMENTS

DE 19525642 A1 * 1/1997 .......... B66C 23/708
DE 102007006873 B3 * 1/2008 .......... B66C 23/708
(Continued)

OTHER PUBLICATIONS

Dec. 6, 2022, International Search Report issued for related PCT Application No. PCT/JP2022/037121.
(Continued)

*Primary Examiner* — Victoria P Augustine
*Assistant Examiner* — Henrix Soto
(74) *Attorney, Agent, or Firm* — Paratus Law Group, PLLC

(57) ABSTRACT

This work machine comprises: a plurality of booms that extend and retract with the power of an actuator; a first pin that is moved by a first spring to connect adjacent booms and is moved by power of a motor to release a connection of the adjacent booms; a second pin that is moved by a second spring to connect the boom and the actuator and is moved by power of the motor to release a connection of the boom and the actuator; and a circuit that is configured so that when the first pin is moved by the first spring or when the second pin is moved by the second spring, a current based on motor idling caused by the movement of the first pin or second pin is not generated.

6 Claims, 9 Drawing Sheets

(58) Field of Classification Search
CPC ..... B66C 23/708; B66C 23/04; B66C 23/305; B66C 23/42; B66C 13/12; B66C 13/22; B66C 13/18; B66C 2700/08; B66C 2700/085; E02F 3/286
See application file for complete search history.

(56) References Cited

U.S. PATENT DOCUMENTS

| | | | | |
|---|---|---|---|---|
| 4,433,515 | A * | 2/1984 | Mentzer | B66C 23/708 212/292 |
| 9,738,498 | B2 * | 8/2017 | Kawabuchi | B66C 23/705 |
| 9,868,617 | B2 * | 1/2018 | Ikeda | B66C 23/701 |
| 10,604,386 | B2 * | 3/2020 | Kawabuchi | B66C 23/54 |
| 2021/0039924 | A1 * | 2/2021 | Zushi | B66C 13/46 |
| 2022/0169484 | A1 | 6/2022 | Zushi et al. | |
| 2022/0212904 | A1 | 7/2022 | Shirai et al. | |

FOREIGN PATENT DOCUMENTS

| | | | | |
|---|---|---|---|---|
| DE | 202008007903 | U1 * | 2/2010 | B66C 23/88 |
| JP | 2002128469 | A * | 5/2002 | B66C 23/705 |
| JP | 2010184754 | A * | 8/2010 | B66C 23/708 |
| JP | 2012-096928 | A | 5/2012 | |
| JP | 2017-159973 | A | 9/2017 | |
| JP | 6635244 | B1 * | 1/2020 | B66C 23/705 |
| WO | WO-2012100768 | A1 * | 8/2012 | B66C 23/708 |
| WO | WO 2020/204153 | A1 | 10/2020 | |
| WO | WO 2021/033771 | A1 | 2/2021 | |

OTHER PUBLICATIONS

Dec. 6, 2022, International Search Opinion issued for related PCT Application No. PCT/JP2022/037121.

* cited by examiner

WORK MACHINE

CROSS REFERENCE TO PRIOR APPLICATION

This application is a National Stage Patent Application of PCT International Patent Application No. PCT/JP2022/037121 (filed on Oct. 4, 2022) under 35 U.S.C. § 371, which claims priority to Japanese Patent Application No. 2021-164917 (filed on Oct. 6, 2021), which are all hereby incorporated by reference in their entirety.

TECHNICAL FIELD

The present invention relates to a work machine including a telescopic boom.

BACKGROUND ART

Patent Literature 1 discloses a mobile crane including a telescopic boom in which a plurality of booms overlap each other in a nested manner (also referred to as a telescopic manner) and a hydraulic extension/retraction cylinder that extends the telescopic boom.

The telescopic boom includes a boom coupling pin that connects the booms which overlap each other in an adjacent manner. A boom that is released from connection by the boom coupling pin (hereinafter, referred to as a movable boom) can be moved with respect to another boom in a longitudinal direction (also referred to as an extending and retracting direction).

The extension/retraction cylinder includes a rod member and a cylinder member. The cylinder member is connected to the movable boom via a cylinder coupling pin. In this state, when the cylinder member moves in the extending and retracting direction, the movable boom is moved together with the cylinder member, so that the telescopic boom is extended and retracted.

CITATION LIST

Patent Literature

Patent Literature 1: JP 2012-96928 A

SUMMARY OF THE INVENTION

Problems to be Solved by the Invention

In the crane as described above, if it takes time to move the coupling pin including the boom coupling pin and the cylinder coupling pin, the time required for extension and retraction of the telescopic boom becomes long, and the work efficiency may be deteriorated.

An object of the present invention is to provide a work machine capable of improving work efficiency.

Solutions to Problems

One aspect of a work machine according to the present invention is a work machine including:

- a plurality of booms that extend and retract by power of an actuator;
- a first pin that is moved by a first spring to connect adjacent booms, and is moved by power of a motor to release a connection of the adjacent booms;
- a second pin that is moved by a second spring to connect the boom and the actuator, and is moved by power of the motor to release a connection of the boom and the actuator; and
- a circuit that is configured so that when the first pin is moved by the first spring or the second pin is moved by the second spring, a current based on motor idling caused by the movement of the first pin or the second pin is not generated.

Effects of the Invention

According to the present invention, it is possible to provide a work machine capable of improving work efficiency.

DESCRIPTION OF EMBODIMENTS

Hereinafter, an example of embodiments according to the present invention will be described in detail based on the drawings. Note that a crane according to the embodiment described below is an example of a work machine according to the present invention, and the present invention is not limited to the embodiments described below.

EMBODIMENT

Figure 1:
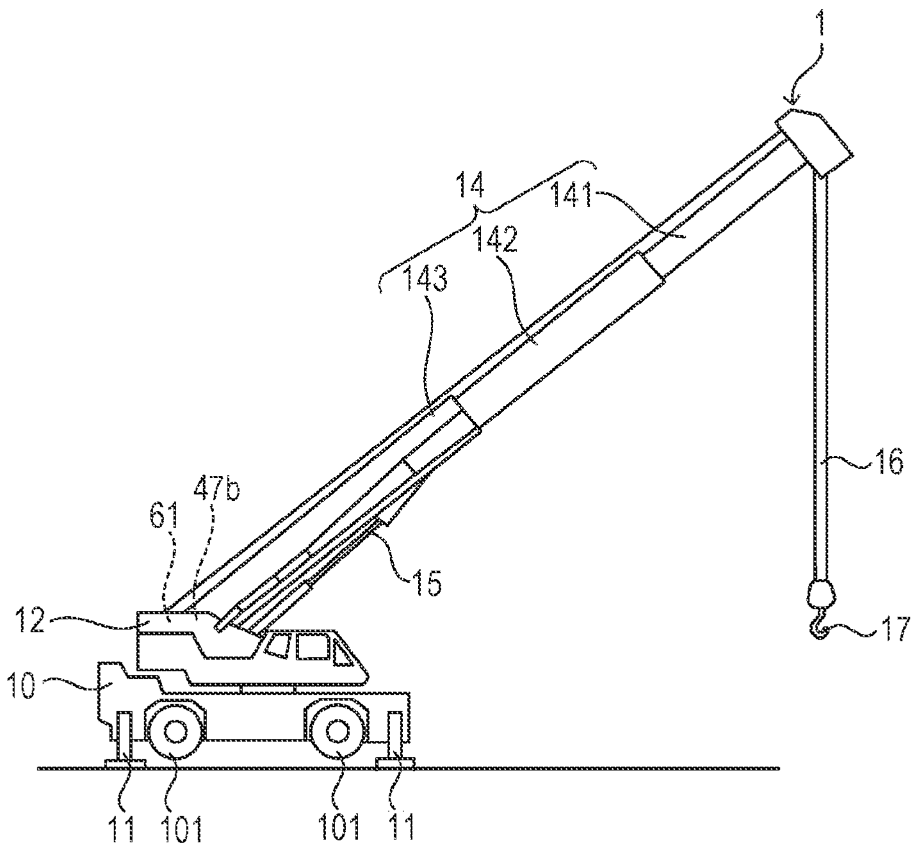
FIG. 1 is a schematic view of a mobile crane according to an embodiment.

FIG. 1 is a schematic view of a mobile crane 1 (in the illustrated case, rough terrain crane) according to the present embodiment. The mobile crane 1 corresponds to an example of a work machine.

Examples of the mobile crane include an all-terrain crane, a truck crane, and a loading truck crane (also referred to as a cargo crane). However, the work machine according to the present invention is not limited to a mobile crane and may be any other work machine (for example, a crane, or a high place work vehicle) including a telescopic boom.

SUMMARY OF PRESENT EMBODIMENT

As illustrated in FIGS. 1 and 2A to 2E, the mobile crane 1 according to the present embodiment includes a telescopic boom 14 and an actuator 2 that extends and retracts the telescopic boom 14.

The telescopic boom 14 has a telescopically combined boom (distal end boom 141, intermediate boom 142, and proximal end boom 143). The adjacent booms are connected by a boom coupling pin (boom coupling pins 144*a*, 144*b*).

The actuator 2 moves the boom in the extending and retracting direction when extending and retracting the telescopic boom 14. At this time, the actuator 2 is connected to the boom to be moved via the cylinder coupling pins 454*a* and 454*b*, and releases the connection between the boom to be moved and the boom adjacent to the boom to be moved by the boom coupling pin. Then, the actuator 2 moves the boom.

In the extension and retraction operation of the telescopic boom 14, when the movement time of the above-described boom coupling pin (boom coupling pins 144*a*, 144*b*) and the cylinder coupling pins 454*a* and 454*b* is long, there is a possibility that the work efficiency deteriorates. Therefore, the mobile crane 1 according to the present embodiment has a function for shortening the movement time of the boom coupling pin (boom coupling pins 144*a*, 144*b*) and the cylinder coupling pins 454*a* and 454*b* in the extension and retraction operation of the telescopic boom 14. In the mobile crane 1 according to the present embodiment, this function is realized by an electric circuit 6 and a control unit 47 to be described later. Hereinafter, the configuration of the mobile crane 1 according to the present embodiment will be specifically described.

<Mobile Crane>

As illustrated in FIG. 1, mobile crane 1 includes a traveling body 10, an outrigger 11, a turning table 12, the telescopic boom 14, the actuator 2 (not illustrated in FIG. 1), the electric circuit 6 (refer to FIGS. 6A to 6E), a raising and lowering cylinder 15, a wire rope 16, and a hook 17.

The traveling body 10 has a plurality of wheels 101. The outriggers 11 are provided at four corners of the traveling body 10. The turning table 12 is rotatably provided on the upper part of the traveling body 10. A proximal end portion of the telescopic boom 14 is fixed to the turning table 12. The actuator 2 extends and retracts the telescopic boom 14. The raising and lowering cylinder 15 raises and lowers the telescopic boom 14. The wire rope 16 is supported by the telescopic boom 14 and hangs down from a distal end portion of the telescopic boom 14. The hook 17 is provided at the tip of the wire rope 16.

<Telescopic Boom>

Subsequently, the telescopic boom 14 will be described with reference to FIGS. 1 and 2A to 2E. FIGS. 2A to 2E are schematic views for describing a structure and an extension and retraction operation of the telescopic boom 14.

The telescopic boom 14 includes a plurality of booms. Each of the plurality of booms has a cylindrical shape. The plurality of booms are combined with each other in a telescopic manner. Specifically, in the retracted state, the plurality of booms are the distal end boom 141, the intermediate boom 142, and the proximal end boom 143 in order from inside.

Furthermore, the distal end boom 141 and the intermediate boom 142 are booms movable in the extending and retracting direction. The proximal end boom 143 is a boom whose movement in the extending and retracting direction is restricted.

Figure 2A:
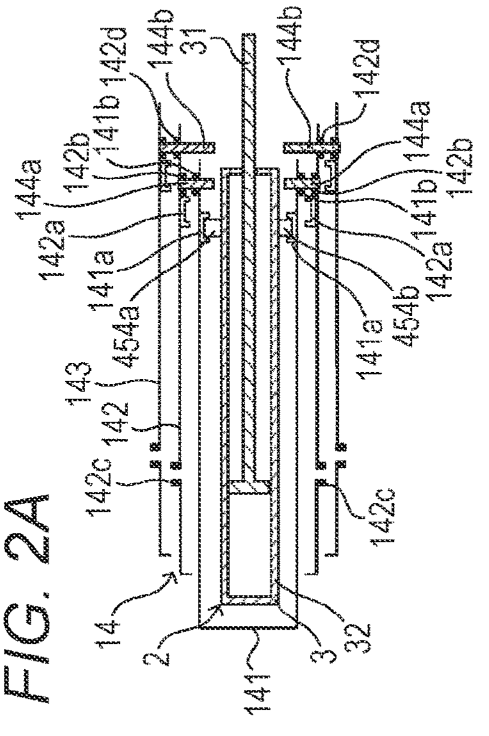
FIGS. 2A to 2E are schematic views for describing a structure and an extension and retraction operation of a telescopic boom.

The telescopic boom 14 extends the boom in order from the boom disposed inside (namely, the distal end boom 141) to make a state transition from the retracted state illustrated in FIG. 2A to the extended state illustrated in FIG. 1.

In the extended state, the intermediate boom 142 is disposed between the proximal end boom 143 on the most proximal end side and the distal end boom 141 on the most distal end side. A plurality of intermediate booms may be provided.

The structure of the telescopic boom 14 is substantially the same as a telescopic boom known from the related art; however, for convenience of describing the structure and the operation of the actuator 2 to be described later, hereinafter, structures of the distal end boom 141 and the intermediate boom 142 will be described.

<Distal End Boom>

The distal end boom 141 has a cylindrical shape and has an internal space where the actuator 2 can be accommodated. The distal end boom 141 includes a pair of cylinder pin receiving portions 141*a* and a pair of boom pin receiving portions 141*b* in the proximal end portion.

The pair of cylinder pin receiving portions 141*a* are coaxially provided in the proximal end portion of the distal end boom 141. Each of the pair of cylinder pin receiving portions 141*a* can be engaged with and disengaged from the pair of cylinder coupling pins 454*a* and 454*b* provided in a cylinder member 32 of the extension/retraction cylinder 3. The pair of cylinder coupling pins 454*a* and 454*b* corresponds to an example of a second pin.

The cylinder coupling pins 454*a* and 454*b* are respectively biased in the first direction in the axial direction of the cylinder coupling pins 454*a* and 454*b* by a first biasing mechanism 455 to be described later. The cylinder coupling pins 454*a* and 454*b* are moved in the second direction in their own axial direction based on the operation of a cylinder coupling mechanism 45 provided in the actuator 2 to be described later. In a state where the pair of cylinder coupling pins 454*a* and 454*b* and the pair of cylinder pin receiving portions 141*a* are engaged with each other, the distal end boom 141 can be moved together with the cylinder member 32 in the extending and retracting direction.

The pair of boom pin receiving portions 141*b* are coaxially provided closer to the proximal end side than the cylinder pin receiving portions 141*a*. The boom pin receiving portions 141*b* are engaged with and disengaged from a pair of boom coupling pins 144*a*, respectively. The pair of boom coupling pins 144*a* corresponds to an example of a first pin.

The pair of boom coupling pins 144*a* is respectively biased in the first direction in the axial direction of the boom coupling pins 144*a* by a second biasing mechanism 463 to be described later. The pair of boom coupling pins 144*a* connects the distal end boom 141 and the intermediate boom 142, respectively.

The pair of boom coupling pins 144*a* are moved in the second direction in their own axial direction based on the operation of a boom coupling mechanism 46 provided in the actuator 2. The pair of boom coupling pins 144*a* may be regarded as constituent members of the boom coupling mechanism 46.

In a state where the distal end boom 141 and the intermediate boom 142 are connected by the pair of boom coupling pins 144*a*, the boom coupling pins 144*a* are inserted through the boom pin receiving portions 141*b* of the distal end boom 141 and a first boom pin receiving portion 142*b* or a second boom pin receiving portion 142*c* of the intermediate boom 142 to be described later in a bridging manner.

In the state where the distal end boom 141 and the intermediate boom 142 are connected (also referred to as a connected state), the distal end boom 141 is prohibited from moving in the extending and retracting direction with respect to the intermediate boom 142.

Meanwhile, in a state where the connection between the distal end boom 141 and the intermediate boom 142 is released (also referred to as a non-connected state), the distal end boom 141 can be moved in the extending and retracting direction with respect to the intermediate boom 142.

<Intermediate Boom>

The intermediate boom 142 has a cylindrical shape and has an internal space where the distal end boom 141 can be accommodated. The intermediate boom 142 includes a pair of cylinder pin receiving portions 142*a*, a pair of first boom pin receiving portions 142*b*, a pair of second boom pin receiving portions 142*c*, and a pair of third boom pin receiving portions 142*d* in the proximal end portion.

The pair of cylinder pin receiving portions 142*a* and the pair of first boom pin receiving portions 142*b* are substantially the same as the pair of cylinder pin receiving portions 141*a* and the pair of boom pin receiving portions 141*b* that the distal end boom 141 includes, respectively.

The pair of third boom pin receiving portions 142*d* are coaxially provided closer to the proximal end side than the pair of first boom pin receiving portions 142*b*. The pair of boom coupling pins 144*b* is inserted through the pair of third boom pin receiving portions 142*d*, respectively. The pair of boom coupling pins 144*b* connects the intermediate boom 142 and the proximal end boom 143. The pair of second boom pin receiving portions 142*c* are coaxially provided in the distal end portion of the intermediate boom 142. The pair of boom coupling pins 144*a* is inserted through the pair of second boom pin receiving portions 142*c*, respectively.

<Actuator>

Hereinafter, the actuator 2 will be described with reference to FIGS. 3 to 8C. The actuator 2 is an actuator that extends and retracts the telescopic boom 14.

The actuator 2 includes the extension/retraction cylinder 3, a pin movement module 4, and control unit 47. In the retracted state (state illustrated in FIG. 2A) of the telescopic boom 14, the actuator 2 is disposed in the internal space of the distal end boom 141.

<Extension/Retraction Cylinder>

The extension/retraction cylinder 3 includes a rod member 31 (also referred to as a fixed side member, and refer to FIGS. 2A to 2E) and a cylinder member 32 (also referred to as a movable side member). The extension/retraction cylinder 3 moves the boom (for example, the distal end boom 141 or the intermediate boom 142), which is connected to the cylinder member 32, in the extending and retracting direction via the cylinder coupling pins 454*a* and 454*b* to be described later.

<Pin Movement Module>

The pin movement module 4 includes a housing (not illustrated), an electric motor 41, a brake mechanism 42, a transmission mechanism 43, a position information detection device 44, the cylinder coupling mechanism 45, the boom coupling mechanism 46.

Hereinafter, each member forming the actuator 2 will be described based on a state where each member is assembled in the actuator 2. In addition, in the description of the actuator 2, an orthogonal coordinate system (X, Y, Z) illustrated in each drawing will be used. However, the disposition of each part forming the actuator 2 is not limited to the disposition in the present embodiment. Further, the configuration of the actuator 2 may be omitted as long as it is not technically inconsistent. In other words, the actuator 2 may be configured by a combination of configurations arbitrarily selected from each configuration described later within a technically consistent range.

In the orthogonal coordinate system illustrated in each drawing, an X-direction coincides with the extending and retracting direction of the telescopic boom 14 in the state of being installed in the mobile crane 1. An X-direction positive side is also referred to as an extending direction in the extending and retracting direction. An X-direction negative side is also referred to as a retracting direction in the extending and retracting direction. Further, a Z-direction coincides with the vertical direction of the mobile crane 1, for example, in a state where the raising and lowering angle of the telescopic boom 14 is 0 (also referred to as a fallen state of the telescopic boom 14). A Y-direction coincides with the vehicle width direction of the mobile crane 1, for example, in a state where the telescopic boom 14 faces forward. However, the Y-direction and the Z-direction are not limited to the above-described directions as long as the Y-direction and the Z-direction are two directions orthogonal to each other.

<Housing>

The housing (not illustrated) is fixed to the cylinder member 32 of the extension/retraction cylinder 3. The cylinder coupling mechanism 45 to be described later and the boom coupling mechanism 46 are accommodated in an internal space of the housing. The housing supports the electric motor 41, the brake mechanism 42, and the transmission mechanism 43 to be described later.

Such a housing unitizes each of the above-described elements. Such a configuration contributes to reduction in size of the pin movement module 4, improvement in productivity, and improvement in system reliability.

The rod member 31 of the extension/retraction cylinder 3 is inserted through a part of the housing in the X-direction. The proximal end portion (end portion on the negative side in the X-direction) of the cylinder member 32 of the extension/retraction cylinder 3 is fixed to a sidewall on the positive side in the X-direction of the housing.

The housing has first through-holes (not illustrated) in sidewalls on both sides in the Y-direction. The pair of cylinder coupling pins 454*a* and 454*b* of the cylinder coupling mechanism 45 are inserted through the first through-holes, respectively.

A transmission shaft 432 (refer to FIG. 3) of the transmission mechanism 43 to be described later is inserted through a part of the housing in the X-direction.

The housing has second through-holes (not illustrated) in sidewalls on both sides in the Y-direction. A pair of second rack bars 461*a* and 461*b* of the boom coupling mechanism 46 are inserted through the second through-holes, respectively.

<Electric Motor>

The electric motor 41 is supported on the housing via a speed reducer 431 of the transmission mechanism 43. Specifically, in a state where an output shaft (not illustrated) is parallel with the X-direction, the electric motor 41 is disposed around the cylinder member 32 (for example, on the Z-direction positive side) and around the housing (for example, on the X-direction negative side or the Z-direction positive side). Such disposition contributes to reduction in size of the pin movement module 4 in the Y-direction and the Z-direction.

The electric motor 41 as described above is connected to, for example, a power supply device 61 (refer to FIGS. 6A to 6E) provided on the turning table 12 via a power supply cable.

Each of the above-described cables can be released and wound by a cord reel provided on the outside of the proximal end portion of the telescopic boom 14 or in the turning table 12 (refer to FIG. 1).

The number of electric motors may be one or plural (for example, two). When there is one electric motor, as in the present embodiment, the cylinder coupling mechanism 45 and the boom coupling mechanism 46 are operated by one electric motor 41. When there are a plurality of (for example, two) electric motors, the first electric motor (not illustrated) may operate the cylinder coupling mechanism 45, and the second electric motor (not illustrated) may operate the boom coupling mechanism 46.

<Brake Mechanism>

The brake mechanism 42 applies a braking force to the electric motor 41. The brake mechanism 42 prevents the rotation of the output shaft of the electric motor 41 in a state where the electric motor 41 is stopped. Accordingly, in a state where the electric motor 41 is stopped, the state of the pin movement module 4 is maintained.

The brake mechanism 42 is connected to, for example, the power supply device (not illustrated) provided on the turning table 12 via a power supply cable. Note that a position information detection device 44 to be described later is also connected to, for example, the power supply device (not illustrated) provided on the turning table 12 via the power supply cable. Furthermore, the position information detection device 44 is connected to a control unit (not illustrated) provided on the turning table 12 via a signal transmission cable. The power supply cable to the electric motor 41, the power supply cable to the brake mechanism 42, the power supply cable to the position information detection device 44, and the signal transmission cable of the position information detection device 44 are collectively arranged in the internal space of the telescopic boom 14 as one multicore cable. With such a configuration, the internal space of the telescopic boom 14 can be efficiently used.

Specifically, in a retracted state of the cylinder coupling mechanism 45 to be described later or in a retracted state of the boom coupling mechanism 46, the brake mechanism 42 operates to maintain the state of the cylinder coupling mechanism 45 or the boom coupling mechanism 46.

<Transmission Mechanism>

The transmission mechanism 43 transmits power of the electric motor 41 to the cylinder coupling mechanism 45 or the boom coupling mechanism 46. The transmission mechanism 43 includes the speed reducer 431 and the transmission shaft 432 (refer to FIG. 7A).

The speed reducer 431 reduces the rotation of the electric motor 41 to transmit the reduced rotation to the transmission shaft 432. The speed reducer 431 is, for example, a planetary gear mechanism.

A first end portion of the transmission shaft 432 is connected to an output shaft (not illustrated) of the speed reducer 431. The transmission shaft 432 rotates together with the output shaft of the speed reducer 431. The transmission shaft 432 extends in the X-direction and is inserted through the housing (not illustrated) of the pin movement module 4.

The second end portion of the transmission shaft 432 protrudes to the X-direction positive side from the housing. The position information detection device 44 to be described later is provided in the end portion on the X-direction positive side of the transmission shaft 432.

<Position Information Detection Device>

The position information detection device 44 detects information on the positions of the pair of cylinder coupling pins 454*a* and 454*b* and the pair of boom coupling pins 144*a* (A pair of boom coupling pins 144*b* may be used. The same applies hereinafter).

Figure 7A:
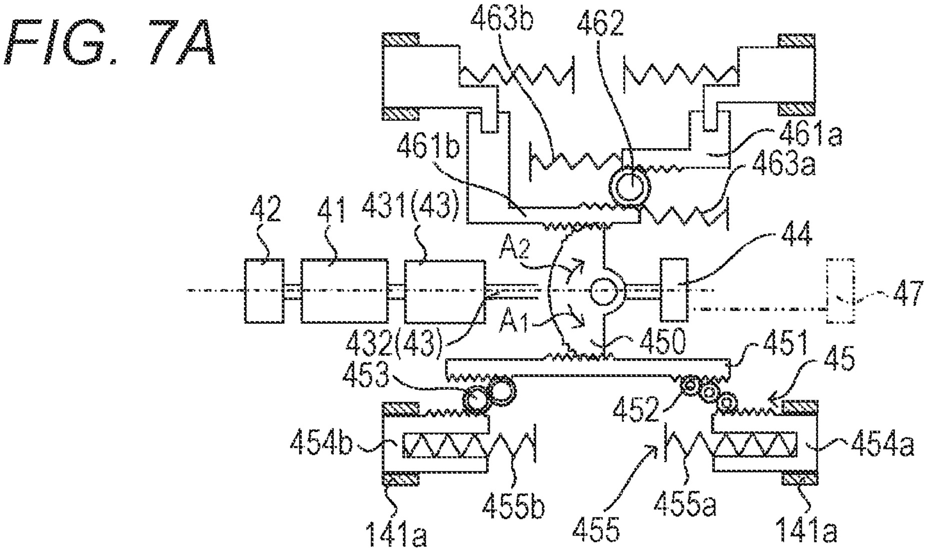
FIG. 7A is a schematic view for describing an operation of the cylinder coupling mechanism.
Figure 8A:
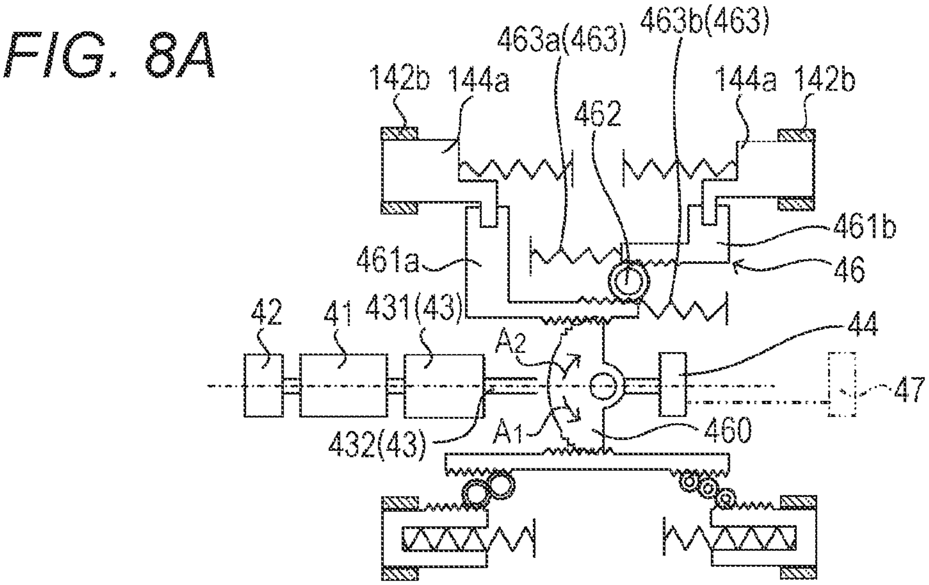
FIG. 8A is a schematic view for describing an operation of the boom coupling mechanism.

The information on the position may be, for example, a movement amount of the pair of cylinder coupling pins 454*a* and 454*b* or the pair of boom coupling pins 144*a* from the reference position (the position illustrated in FIGS. 7A and 8A). The positions of the pair of cylinder coupling pins 454*a* and 454*b* illustrated in FIGS. 7A and 8A are defined as reference positions of the cylinder coupling pins 454*a* and 454*b*. Further, the positions of the pair of boom coupling pins 144*a* illustrated in FIGS. 7A and 8A are defined as reference positions of the boom coupling pins 144*a*.

The information on the positions of the pair of cylinder coupling pins 454*a* and 454*b* and the pair of boom coupling pins 144*a* detected by the position information detection device 44 is used for various controls of the actuator 2 including the control of the electric motor 41.

<Cylinder Coupling Mechanism>

Figure 4:
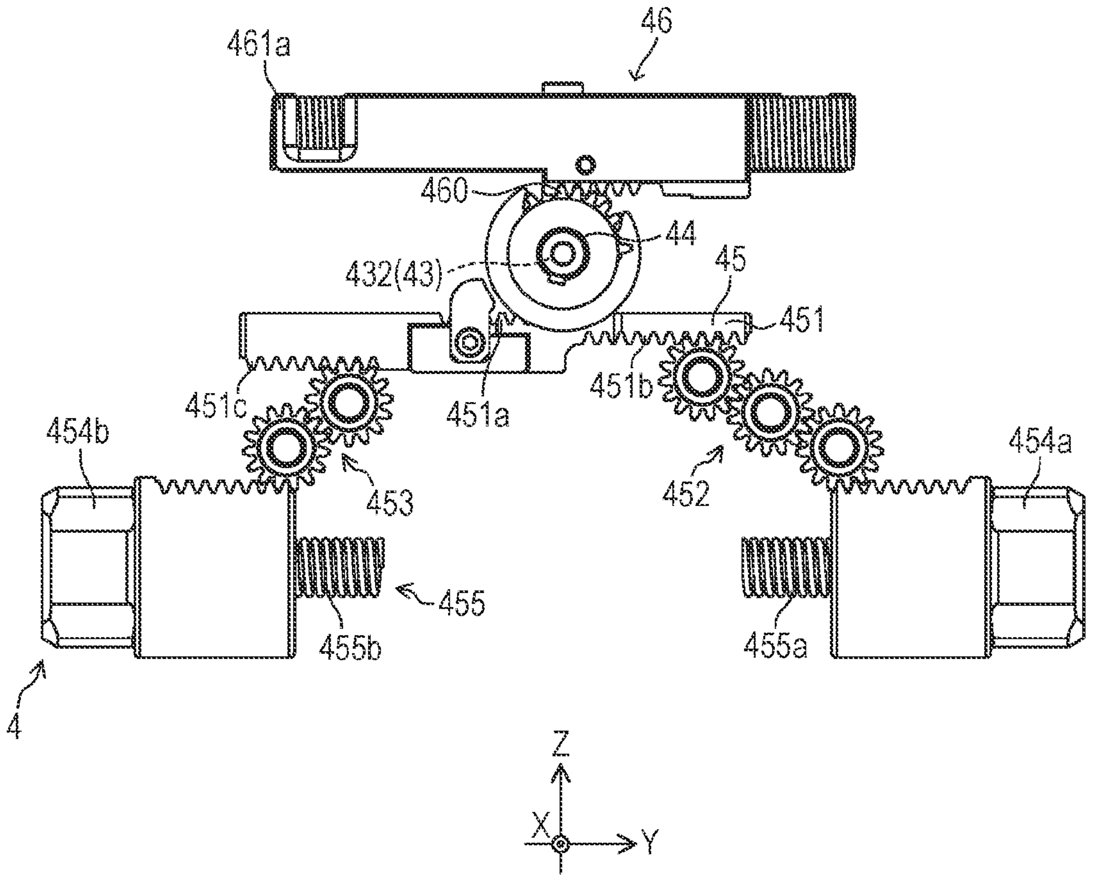
FIG. 4 is a front view of the pin movement module in which a boom coupling mechanism is in a retracted state and a cylinder coupling mechanism is in an extended state.
Figure 5:
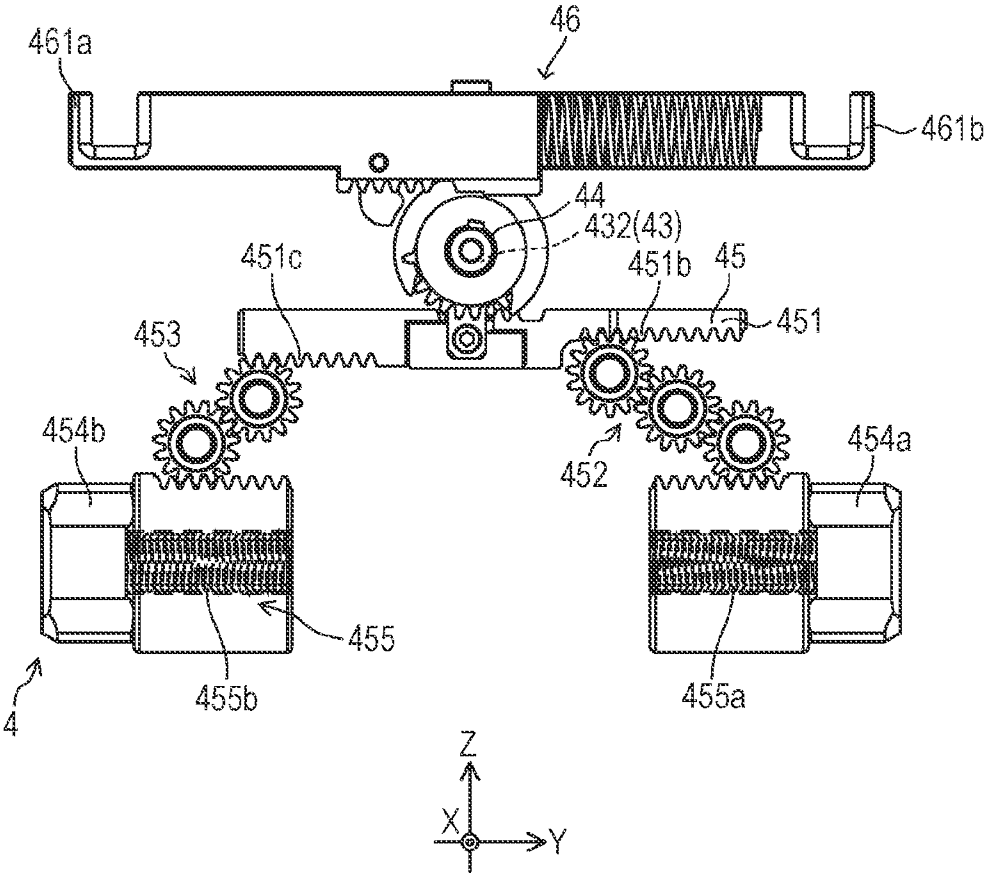
FIG. 5 is a front view of the pin movement module in which the boom coupling mechanism is in an extended state and the cylinder coupling mechanism is in a retracted state.

The cylinder coupling mechanism 45 operates based on the power of the electric motor 41 and makes a state transition between the extended state (refer to FIGS. 3 and 4) and the retracted state (refer to FIG. 5). The operation in which the cylinder coupling mechanism 45 transitions from the extended state to the retracted state is referred to as a removal operation of the cylinder coupling mechanism 45. The operation in which the cylinder coupling mechanism 45 transitions from the retracted state to the extended state is referred to as an entry operation of the cylinder coupling mechanism 45.

In the extended state, the pair of cylinder coupling pins 454*a* and 454*b* to be described later and the pair of cylinder pin receiving portions 141*a* of a boom (for example, the distal end boom 141) enter the engaged state (also referred to as an entry state of a cylinder pin). In such an engaged state, the boom and the cylinder member 32 enter a connected state. That is, by the entry operation of the cylinder coupling mechanism 45, the pair of cylinder coupling pins 454*a* and 454*b* returns to the reference position by the first biasing mechanism 455 to be described later.

Figure 2B:
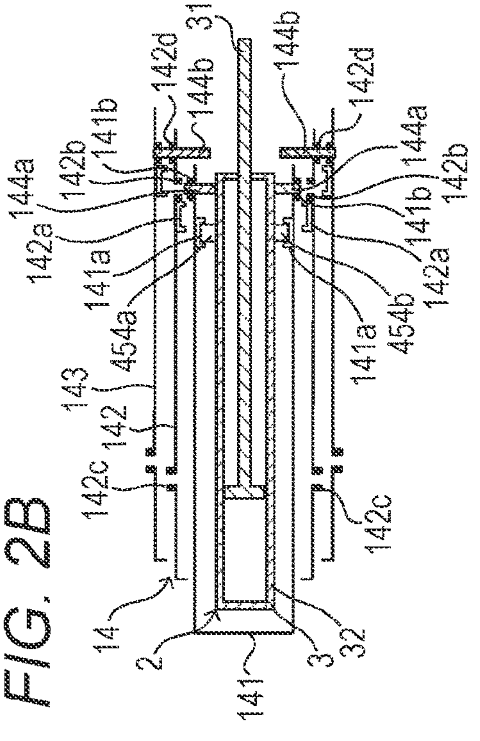
Figure 2C:
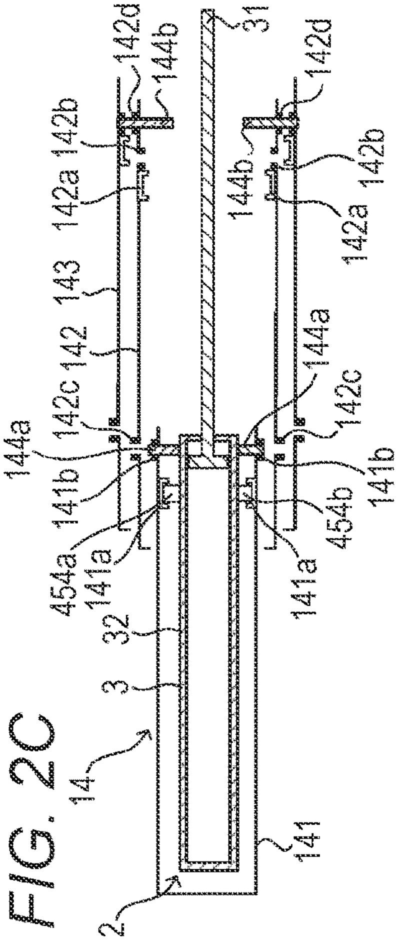
Figure 2D:
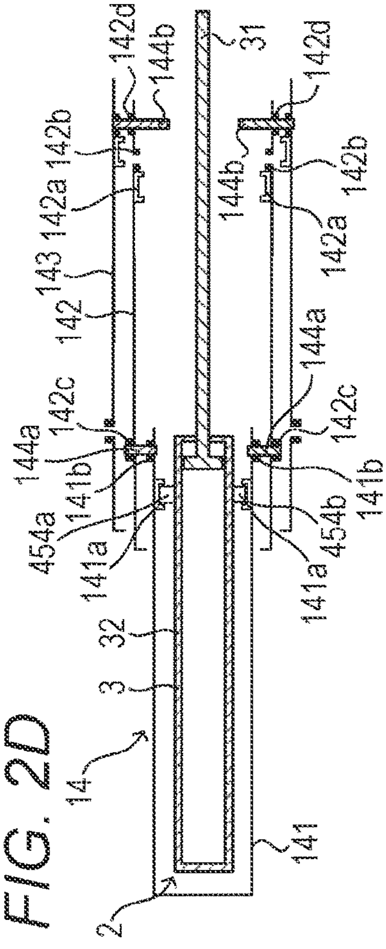
Figure 2E:
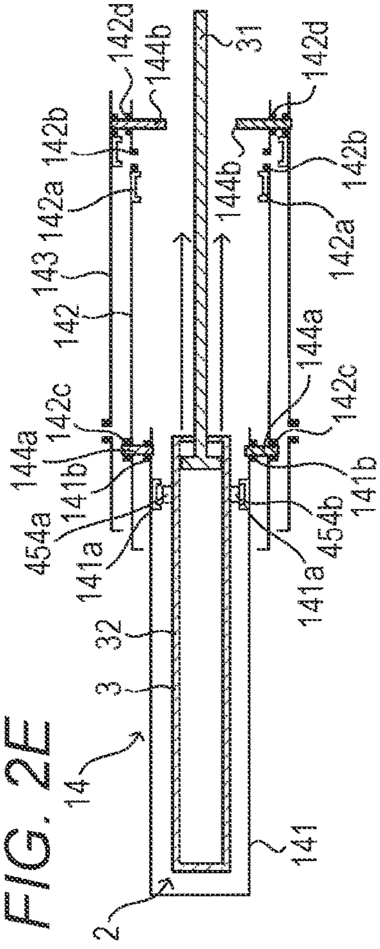

Meanwhile, in the retracted state, the pair of cylinder coupling pins 454*a* and 454*b* and the pair of cylinder pin receiving portions 141*a* (refer to FIGS. 2A to 2E) enter a disengaged state (the state illustrated in FIG. 2E and also referred to as a removal state of a cylinder pin). In the disengaged state, the boom and the cylinder member 32 enter a non-connected state.

Figure 3:
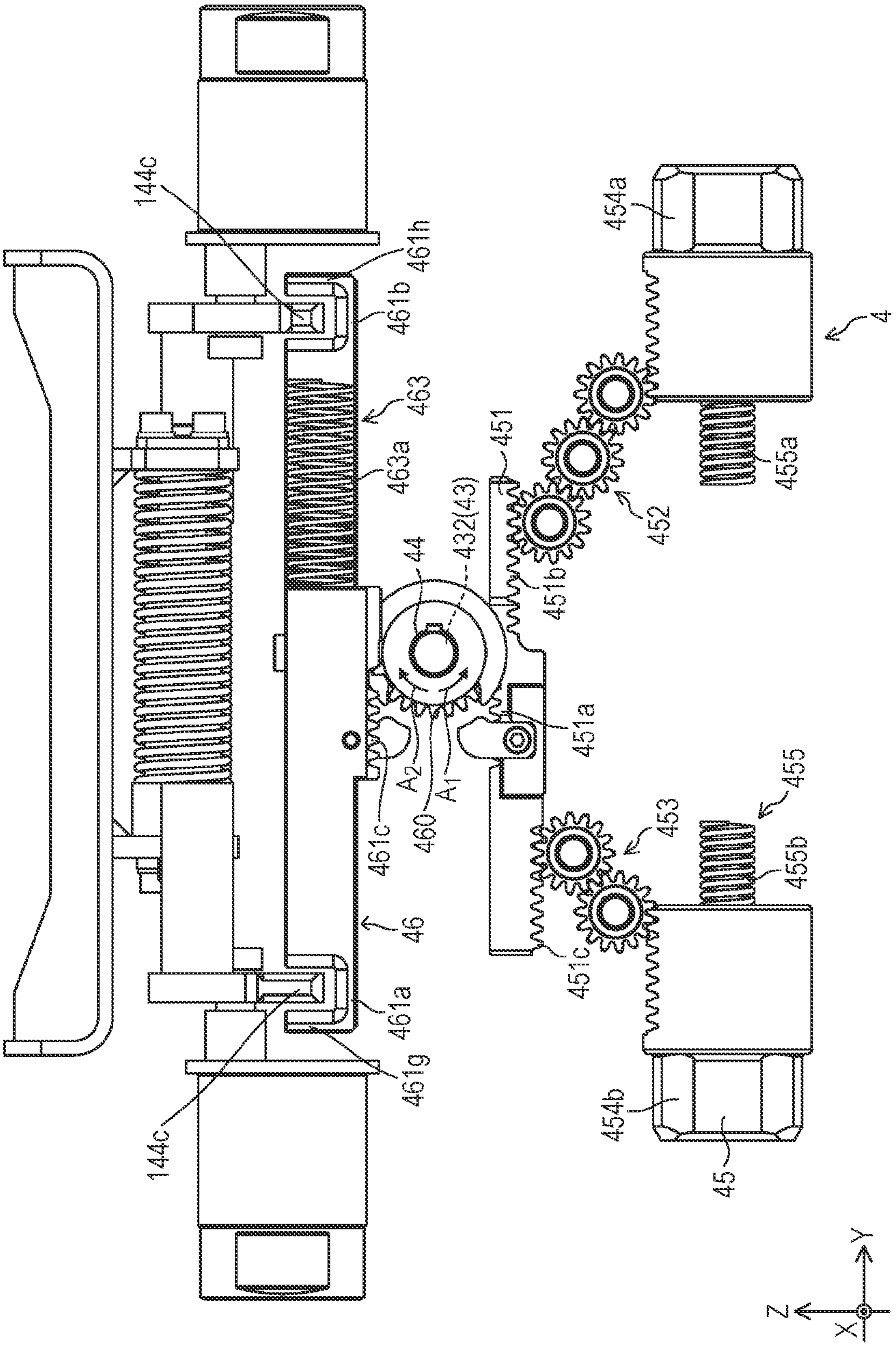
FIG. 3 is a front view of a pin movement module in an extended state and in a state of holding boom coupling pins.

As illustrated in FIGS. 3, 4, and 5, the cylinder coupling mechanism 45 includes a first tooth-missing gear 450 (refer to FIGS. 7A to 7C), a first rack bar 451, a first gear mechanism 452, a second gear mechanism 453, the pair of cylinder coupling pins 454*a* and 454*b*, and the first biasing mechanism 455.

<First Tooth-Missing Gear>

The first tooth-missing gear 450 (also referred to as a switch gear) has a substantially disk shape. The first tooth-missing gear 450 has a first tooth portion in a part of the outer peripheral surface. The first tooth-missing gear 450 is externally fitted and fixed to the transmission shaft 432 to rotate together with the transmission shaft 432. In the present embodiment, the first tooth-missing gear 450 is disposed so as to overlap a second tooth-missing gear 460 to be described later in the front-rear direction. Therefore, in FIGS. 3 to 5, the first tooth-missing gear 450 is not illustrated.

The first tooth-missing gear 450 forms the switch gear, together with the second tooth-missing gear 460 (refer to FIG. 3) of the boom coupling mechanism 46. The switch gear selectively transmits power of the electric motor 41 to any one coupling mechanism of the cylinder coupling mechanism 45 and the boom coupling mechanism 46.

In the following description, when the cylinder coupling mechanism 45 makes a state transition from the extended state (refer to FIGS. 3, 4, and 7A) to the retracted state (refer to FIGS. 5 and 7C), the rotation direction (direction indicated by arrow A1 in FIGS. 7A to 7C) of the first tooth-missing gear 450 is the first direction in the rotation direction of the first tooth-missing gear 450.

On the other hand, the rotation direction (direction indicated by arrow A2 in FIGS. 7A to 7C) of the first tooth-missing gear 450 when the cylinder coupling mechanism 45 transitions from the retracted state to the extended state is the second direction in the rotation direction of the first tooth-missing gear 450.

<First Rack Bar>

The first rack bar 451 is moved in a longitudinal direction (also referred to as the Y-direction) thereof according to the rotation of the first tooth-missing gear 450. In the extended state (refer to FIGS. 3 and 4), the first rack bar 451 is positioned on a Y-direction negative-most side. Meanwhile, in the retracted state (refer to FIG. 5), the first rack bar 451 is positioned on a Y-direction positive-most side.

During a state transition from the extended state to the retracted state, when the first tooth-missing gear 450 rotates in the first direction, the first rack bar 451 is moved to a Y-direction positive side (also referred to as one side in the longitudinal direction).

On the other hand, when the state transitions from the retracted state to the extended state, when the first tooth-missing gear 450 rotates in the second direction, the first rack bar 451 is moved to the Y-direction negative side (also referred to as the other side in the longitudinal direction).

The first rack bar 451 includes a first rack tooth portion in a surface thereof, the surface being on a side (also referred to as the Z-direction positive side) close to the first tooth-missing gear 450. Only when the above-described state transition is made, the first rack tooth portion meshes with the first tooth portion of the first tooth-missing gear 450.

When the first tooth-missing gear 450 rotates by a predetermined amount in the first direction in the extended state, the first tooth portion of the first tooth-missing gear 450 meshes with the first rack tooth portion of the first rack bar 451. When the first tooth-missing gear 450 further rotates in the first direction from this state, the first rack bar 451 is moved to the Y-direction positive side the according to the rotation of the first tooth-missing gear 450.

Furthermore, when the first tooth-missing gear 450 rotates in the second direction from the extended state illustrated in FIG. 3, the first rack tooth portion of the first rack bar 451 and the first tooth portion of the first tooth-missing gear 450 do not mesh with each other.

In addition, the first rack bar 451 includes a second rack tooth portion and a third rack tooth portion on a surface thereof, the surface being on a side (also referred to as a Z-direction negative side) distant from the first tooth-missing gear 450. The second rack tooth portion meshes with the first gear mechanism 452 to be described later. The third rack tooth portion meshes with the second gear mechanism 453 to be described later.

<First Gear Mechanism>

The first gear mechanism 452 includes a plurality (in the case of the present embodiment, three) of gear elements (refer to FIG. 3) of which each is a spur gear. The first gear mechanism 452 meshes with the second rack tooth portion of the first rack bar 451. The first gear mechanism 452 rotates in accordance with the movement of the first rack bar 451 in the Y-direction. In addition, the first gear mechanism 452 meshes with a pin-side rack tooth portion of one cylinder coupling pin 454*a* to be described later.

<Second Gear Mechanism>

The second gear mechanism 453 includes a plurality (in the case of the present embodiment, two) of gear elements (refer to FIG. 3) of which each is a spur gear. The second gear mechanism 453 meshes with the third rack tooth portion of the first rack bar 451. The second gear mechanism 453 rotates in accordance with the movement of the first rack bar 451 in the Y-direction. In addition, the second gear mechanism 453 meshes with a pin-side rack tooth portion of the other cylinder coupling pin 454*b* to be described later.

Note that the number of gears constituting the first gear mechanism 452 and the second gear mechanism 453 is not limited to the case of the present embodiment. From the viewpoint of moving one cylinder coupling pin 454*a* and the other cylinder coupling pin 454*b* in opposite directions to each other according to the movement of the first rack bar 451, the number of gears of the first gear mechanism 452 may be an odd number, and the number of gears of the second gear mechanism 453 may be an even number.

Further, the number of gears of the first gear mechanism 452 and the number of gears of the second gear mechanism 453 may be determined by the relationship with the number of components of the pin movement module 4 and the dimension in the right-left direction (Y-direction). For example, if the number of gears of the first gear mechanism 452 is one, the number of parts can be reduced, but since it is necessary to match the positions in the Y-direction of the meshing portion between the first gear mechanism 452 and the first rack bar 451 and the meshing portion between the first gear mechanism 452 and the cylinder coupling pin 454*a*, the dimension of the first rack bar 451 in the Y-direction increases. On the other hand, as in the present embodiment, if the number of gears of the first gear mechanism 452 is three, the number of parts increases, but since the meshing portion between the first gear mechanism 452 and the first rack bar 451 can be positioned on the left side (Y-direction negative side) of the meshing portion between the first gear mechanism 452 and the cylinder coupling pin 454*a*, the dimension of the first rack bar 451 in the Y-direction can be reduced.

<Cylinder Coupling Pin>

The pair of cylinder coupling pins 454*a* and 454*b* have central axes coinciding with the Y-direction and are coaxial with each other, respectively. The pair of cylinder coupling pins 454*a* and 454*b* include the pin-side rack tooth portions on outer peripheral surfaces thereof, respectively. In addition, the pin-side rack tooth portion of one cylinder coupling pin 454*a* meshes with the first gear mechanism 452.

One cylinder coupling pin 454*a* is moved in its own axial direction in accordance with the rotation of the first gear mechanism 452. Specifically, one cylinder coupling pin 454*a* is moved to the Y-direction positive side (also referred to as the second direction) when transitioning from the retracted state to the extended state. Meanwhile, one cylinder coupling pin 454*a* is moved to the Y-direction negative side (also referred to as the first direction) when transitioning from the extended state to the retracted state.

The pin-side rack tooth portion of the other (also referred to as the Y-direction negative side) cylinder coupling pin 454*b* meshes with the second gear mechanism 453.

The other cylinder coupling pin 454*b* is moved in its own axial direction in accordance with the rotation of the second gear mechanism 453. Specifically, the other cylinder coupling pin 454*b* is moved to the Y-direction negative side (also referred to as the second direction) when transitioning from the retracted state to the extended state. Meanwhile, the other cylinder coupling pin 454*b* is moved to the Y-direction positive side (also referred to as the first direction) when transitioning from the extended state to the retracted state. In the above-described state transition, the pair of cylinder coupling pins 454*a* and 454*b* are moved in directions opposite to each other in the Y-direction.

The pair of cylinder coupling pins 454*a* and 454*b* are inserted through the first through-holes of the housing (not illustrated), respectively. Distal end portions of the pair of cylinder coupling pins 454*a* and 454*b* protrude to the outside of the housing, respectively.

<First Biasing Mechanism>

The first biasing mechanism 455 corresponds to an example of a biasing portion and a first biasing member and returns the cylinder coupling mechanism 45 to the extended state when the electric motor 41 is in a non-energized state in the retracted state of the cylinder coupling mechanism 45. In other words, the first biasing mechanism 455 returns the pair of cylinder coupling pins 454*a* and 454*b* to the reference positions when the electric motor 41 is in the non-energized state (stopped state) in the retracted state of the cylinder coupling mechanism 45. The first biasing mechanism 455 biases the pair of cylinder coupling pins 454*a* and 454*b* in directions away from each other.

In other words, the first biasing mechanism 455 biases the pair of cylinder coupling pins 454*a* and 454*b* in the first direction in the axial direction of the pair of cylinder coupling pins 454*a* and 454*b*. The first direction in the axial direction of the cylinder coupling pin 454*a* and the first direction in the axial direction of the cylinder coupling pin 454*b* are opposite directions with respect to the Y-direction.

Further, the first biasing mechanism 455 may directly bias the cylinder coupling pins 454*a* and 454*b* or may indirectly bias the cylinder coupling pins via another member.

Specifically, the first biasing mechanism 455 includes configured with a pair of coil springs 455*a* and 455*b* (refer to FIG. 3). Each of the pair of coil springs 455*a* and 455*b* corresponds to an example of a second spring, and biases the pair of cylinder coupling pins 454*a* and 454*b* in the first direction in the axial direction of the cylinder coupling pins 454*a* and 454*b*. When the brake mechanism 42 is in operation, the cylinder coupling mechanism 45 does not transition from the retracted state to the extended state.

<Boom Coupling Mechanism>

The boom coupling mechanism 46 transitions between an extended state (refer to FIGS. 3 and 5) and a retracted state (refer to FIG. 4) based on the rotation of the electric motor 41. The operation in which the boom coupling mechanism 46 transitions from the extended state to the retracted state is referred to as a removal operation of the boom coupling mechanism 46. The operation in which the boom coupling mechanism 46 transitions from the retracted state to the extended state is referred to as an entry operation of the boom coupling mechanism 46.

In the extended state, the boom coupling mechanism 46 can take either an engaged state or the disengaged state with respect to boom coupling pins (for example, the pair of boom coupling pins 144*a*).

In a state where the boom coupling mechanism 46 is engaged with boom coupling pins, the boom coupling mechanism 46 makes a state transition from the extended state to the retracted state to cause the boom coupling pins to disengage from the boom.

In addition, in a state where the boom coupling mechanism 46 is engaged with the boom coupling pins, the boom coupling mechanism 46 makes a state transition from the retracted state to the extended state to cause the boom coupling pins to engage with the boom. That is, the boom coupling pin returns to the reference position by the second biasing mechanism 463 to be described later by the entry operation of the boom coupling mechanism 46.

As illustrated in FIG. 3, the boom coupling mechanism 46 includes a second tooth-missing gear 460, the pair of second rack bars 461*a* and 461*b*, a synchronous gear 462 (refer to FIGS. 8A to 8C), and a second biasing mechanism 463.

<Second Tooth-Missing Gear>

The second tooth-missing gear 460 (also referred to as a switch gear) has a substantially disk shape and includes a second tooth portion in a part of an outer peripheral surface thereof in a circumferential direction.

The second tooth-missing gear 460 is externally fitted and fixed to a portion closer to the X-direction positive side in the transmission shaft 432 than the first tooth-missing gear 450, to rotate together with the transmission shaft 432. The second tooth-missing gear 460 may be a tooth-missing gear integrated with the first tooth-missing gear 450.

Hereinafter, the rotation direction of the second tooth-missing gear 460 (direction indicated by arrow A2 in FIGS. 3 and 8A to 8C) when the boom coupling mechanism 46 transitions from the extended state (refer to FIGS. 3 and 5) to the retracted state (refer to FIG. 4) is the first direction in the rotation direction of the second tooth-missing gear 460.

On the other hand, the rotation direction of the second tooth-missing gear 460 (direction indicated by arrow A1 in FIGS. 3 and 8A to 8C) when the boom coupling mechanism 46 transitions from the retracted state to the extended state is the second direction in the rotation direction of the second tooth-missing gear 460.

FIG. 3 is a view of the pin movement module 4 as seen from the X-direction positive side. Therefore, in the case of the present embodiment, the first direction and the second direction in the rotation direction of the second tooth-missing gear 460 are opposite to the first direction and the second direction in the rotation direction of the first tooth-missing gear 450.

Namely, the rotation direction of the second tooth-missing gear 460 when the boom coupling mechanism 46 makes a state transition from the extended state to the retracted state is reversed to the rotation direction of the first tooth-missing gear 450 when the cylinder coupling mechanism 45 makes a state transition from the extended state to the retracted state.

<Second Rack Bar>

As the second tooth-missing gear 460 rotates, each of the pair of second rack bars 461*a* and 461*b* are moved in the Y-direction (also referred to as the axial direction). One (X-direction positive side) of the second rack bars 461*a* and the other (X-direction negative side) of the second rack bars 461*b* are moved in opposite directions in the Y-direction.

Each of the pair of second rack bars 461*a* and 461*b* is, for example, shaft members that are long in the Y-direction, and are disposed in parallel with each other.

Each of the pair of second rack bars 461*a* and 461*b* is disposed closer to the Z-direction positive side than the first rack bar 451.

Each of the pair of second rack bars 461*a* and 461*b* has synchronous rack tooth portions on side surfaces facing each other in the X-direction. Each of the synchronous rack tooth portions meshes with the synchronous gear 462. When the synchronous gear 462 rotates, the one second rack bar 461*a* and the other second rack bar 461*b* are moved in opposite directions in the Y-direction.

Each of the pair of second rack bars 461*a* and 461*b* has locking claw portions 461*g* and 461*h* in distal end portions thereof. The locking claw portions 461*g* and 461*h* are engaged with pin-side receiving portions 144*c* (refer to FIG. 3) provided in the boom coupling pin when the boom coupling pin (for example, boom coupling pins 144*a*, 144*b*) is moved.

One of the second rack bars 461*a* has a driving rack tooth portion 461*c* (refer to FIG. 3) on a side surface facing the second tooth-missing gear 460. The driving rack tooth portion 461*c* meshes with the second tooth portion of the second tooth-missing gear 460.

When the second tooth-missing gear 460 rotates by a predetermined amount in the first direction from the extended state, the driving rack tooth portion 461*c* meshes with the second tooth portion of the second tooth-missing gear 460. When the second tooth-missing gear 460 further rotates in the first direction, one of the second rack bars 461*a* is moved to the Y-direction positive side based on the meshing between the driving rack tooth portion 461*c* and the second tooth portion of the second tooth-missing gear 460.

Furthermore, when the one second rack bar 461*a* is moved to the Y-direction positive side, the synchronous gear 462 rotates, so that the other second rack bar 461*b* is moved to the Y-direction negative side (namely, opposite side from the one second rack bar 461*a*).

<Second Biasing Mechanism>

The second biasing mechanism 463 corresponds to an example of the biasing portion and the second biasing member, and returns the boom coupling mechanism 46 to the extended state when the electric motor 41 is in the non-energized state in the retracted state of the boom coupling mechanism 46. In other words, the second biasing mechanism 463 returns the boom coupling pin (for example, the pair of boom coupling pins 144*a*) to the reference position when the electric motor 41 is in the non-energized state (stopped state) in the retracted state of the second biasing mechanism 463. Further, when the brake mechanism 42 is in operation, the boom coupling mechanism 46 does not transition from the retracted state to the extended state.

The second biasing mechanism 463 biases the pair of second rack bars 461*a* and 461*b* in a direction away from each other. In other words, the second biasing mechanism 463 indirectly biases the boom coupling pin in the first direction in the axial direction of the boom coupling pin via the pair of second rack bars 461*a* and 461*b* in a state where the boom coupling mechanism 46 and the boom coupling pin (for example, a pair of boom coupling pins 144*a*) are engaged with each other.

Specifically, the second biasing mechanism 463 is configured by a pair of coil springs 463*a* and 463*b* (refer to FIG. 8A). Each of the pair of coil springs 463*a* and 463*b* corresponds to an example of a first spring, and biases the proximal end portions of the pair of second rack bars 461*a* and 461*b* toward the distal end side.

<Control Unit>

The control unit 47 is, for example, an in-vehicle computer (processor) configured with an input terminal, an output terminal, a CPU, a memory, and the like. The function of the control unit 47 may be realized by a control circuit.

The control unit 47 as described above is mounted on the mobile crane 1 (Specifically, the turning table 12). However, the position of the control unit 47 is not limited to the turning table 12. The control unit 47 controls switches 62 to 66 of the electric circuit 6 to be described later. A specific function of the control unit 47 will be described later together with the configuration of the electric circuit 6.

<Electric Circuit>

Next, the electric circuit 6 will be described with reference to FIGS. 6A to 6E. The electric circuit 6 realizes a plurality of states by switching the switches under the control of the control unit 47. A plurality of states realized by the electric circuit 6 will be described later.

The electric circuit 6 includes the power supply device 61, a first switch 62, a second switch 63, a third switch 64, a fourth switch 65, a fifth switch 66, and the electric motor 41.

The power supply device 61 is provided, for example, on the turning table 12 (refer to FIG. 1).

The first switch 62 is provided on a first line 6L1. The first switch 62 can take either an ON state or an OFF state under the control of the control unit 47 (refer to FIG. 1).

The second switch 63 is provided in series with the first switch 62 on the first line 6L1. The second switch 63 is provided on the downstream side of the first switch 62 in the direction in which the current flows in the first line 6L1. The second switch 63 can take either an ON state or an OFF state under the control of the control unit 47.

The first switch 62 and the second switch 63 are configured by a first relay circuit 681. The first relay circuit 681 turns on one of the first switch 62 and the second switch 63 and turns off the other switch based on a command signal from the control unit 47.

The third switch 64 is provided on a second line 6L2. The second line 6L2 is provided in parallel with the first line 6L1. The third switch 64 can take either an ON state or an OFF state under the control of the control unit 47.

The fourth switch 65 is provided in series with the third switch 64 on the second line 6L2. The fourth switch 65 is provided on the downstream side (hereinafter, it is simply referred to as a "downstream side") of the third switch 64 in the direction in which the current flows in the second line 6L2. The fourth switch 65 can take either an ON state or an OFF state under the control of the control unit 47.

The third switch 64 and the fourth switch 65 are configured by a second relay circuit 682. The second relay circuit 682 turns on one of the third switch 64 and the fourth switch 65 and turns off the other switch based on a command signal from the control unit 47.

The fifth switch 66 is configured by a third relay circuit 683 and is provided on a third line 6L3. The third line 6L3 is provided in series with the first line 6L1 and the second line 612 on the downstream side of the first line 6L1 and the second line 6L2. The fifth switch 66 (the third relay circuit 683) can take either an ON state or an OFF state under the control of the control unit 47.

The configuration of the electric motor 41 is as described above. The electric motor 41 is provided on a fourth line 6L4. The fourth line 6L4 connects a portion between the first switch 62 and the second switch 63 in the first line 6L1 and a portion between the third switch 64 and the fourth switch 65 in the second line 6L2.

Figure 6A:
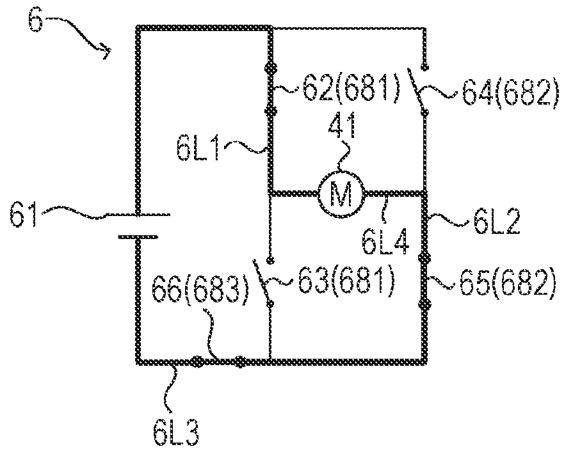
FIG. 6A is a circuit diagram of an electric circuit in a first driving state.
Figure 6B:
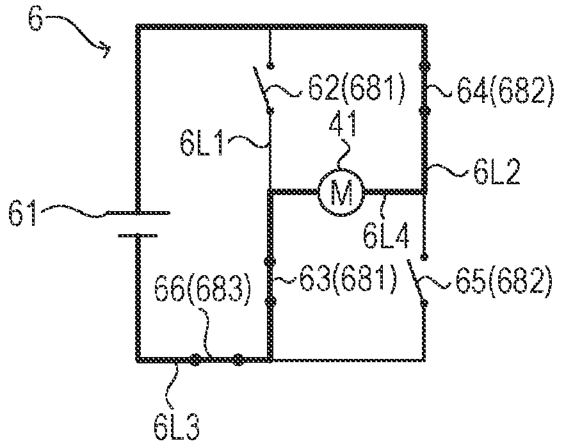
FIG. 6B is a circuit diagram of an electric circuit in a second driving state.
Figure 6C:
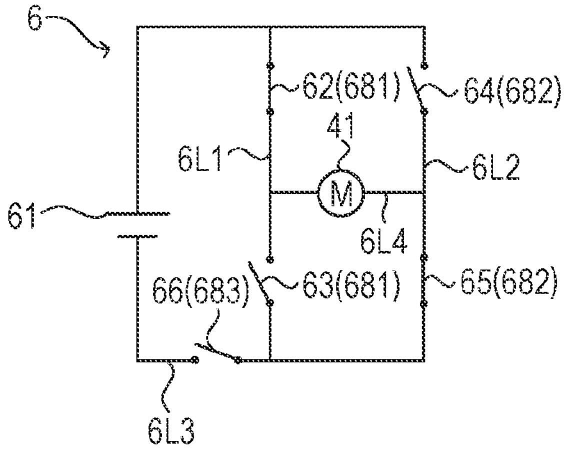
FIG. 6C is a circuit diagram of an electric circuit in a first release state.
Figure 6D:
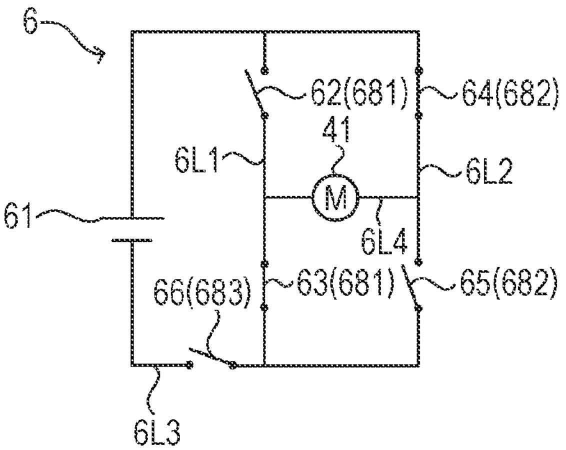
FIG. 6D is a circuit diagram of an electric circuit in a second release state.
Figure 6E:
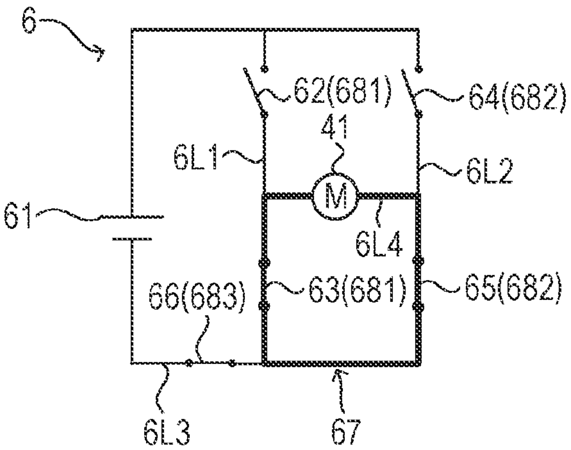
FIG. 6E is a circuit diagram of an electric circuit in a braking state.

The above-described electric circuit 6 can take the first driving state illustrated in FIG. 6A, the second driving state illustrated in FIG. 6B, a first release state illustrated in FIG. 6C, a second release state illustrated in FIG. 6D, and a braking state illustrated in FIG. 6E.

<First Driving State>

The first driving state of the electric circuit 6 corresponds to a first state of the electric circuit 6, and is a state in which a current in a first direction flows through the electric motor 41 as illustrated in FIG. 6A. The first direction is a direction from the first line 6L1 to the second line 612 in the fourth line 6L4. In the first driving state of the electric circuit 6, the current flows through a circuit indicated by a thick line in FIG. 6A.

In the first driving state of the electric circuit 6, the electric motor 41 rotates in the first direction. In the first driving state of the electric circuit 6, the first switch 62, the fourth switch 65, and the fifth switch 66 are in an ON state. In the first driving state of the electric circuit 6, the second switch 63 and the third switch 64 are in an OFF state. The first driving state corresponds to an example of a driving state of the electric circuit.

The first driving state of the electric circuit 6 is a state for causing the cylinder coupling mechanism 45 to transition from the extended state to the retracted state (removal operation of the cylinder coupling mechanism 45). The control unit 47 switches the electric circuit 6 to the first driving state in a case where the removal operation of the cylinder coupling mechanism 45 is realized.

<Second Driving State>

The second driving state of the electric circuit 6 corresponds to a second state of the electric circuit 6, and is a state in which a current in a second direction flows through the electric motor 41 as illustrated in FIG. 6B. The second direction is a direction from the second line 612 toward the first line 6L1 in the fourth line 6L4. In the second driving state of the electric circuit 6, the current flows through the circuit indicated by a thick line in FIG. 6B.

In the second driving state of the electric circuit 6, the electric motor 41 rotates in the second direction. In the second driving state of the electric circuit 6, the second switch 63, the third switch 64, and the fifth switch 66 are in an ON state. In the second driving state of the electric circuit 6, the first switch 62 and the fourth switch 65 are in an OFF state.

The second driving state of the electric circuit 6 is a state for causing the boom coupling mechanism 46 to transition from the extended state to the retracted state (removal operation of the boom coupling mechanism 46). The control unit 47 switches the electric circuit 6 to the second driving state in a case where the removal operation of the boom coupling mechanism 46 is realized.

<First Release State>

The first release state of the electric circuit 6 corresponds to an example of a third state of the electric circuit 6, and is a state (non-driving state) in which no current flows through the electric motor 41 as illustrated in FIG. 6C.

In the first release state of the electric circuit 6, the first switch 62 and the fourth switch 65 are in an ON state. Further, in the first release state of the electric circuit 6, the second switch 63, the third switch 64, and the fifth switch 66 are in an OFF state. That is, in the first release state of the electric circuit 6, the second switch 63 provided in a closed circuit 67 (the circuit indicated by the thick line in FIG. 6E) including the electric motor 41 is opened (turned into the OFF state).

The control unit 47 switches the electric circuit 6 to the first release state when the cylinder coupling mechanism 45 makes a state transition (an entry operation of the cylinder coupling mechanism 45) from the retracted state to the extended state. In other words, the control unit 47 switches the electric circuit 6 to the first release state when the pair of cylinder coupling pins 454*a* and 454*b* are moved by the biasing force received from the first biasing mechanism 455. Note that the instruction for causing the entry operation of the cylinder coupling mechanism 45 may be, for example, an instruction based on an operation input from an operator or an instruction based on a program incorporated in advance in the control unit 47.

In the first release state of the electric circuit 6, a closed circuit including the electric motor 41 is not formed in the electric circuit 6. Hereinafter, the reason for adopting such a configuration will be described.

In the entry operation of the cylinder coupling mechanism 45, when the electric circuit 6 is in the first release state and the brake mechanism 42 is in the release state, the pair of cylinder coupling pins 454*a* and 454*b* is moved in the first direction in the axial direction based on the biasing force of the first biasing mechanism 455. Then, as the pair of cylinder coupling pins 454*a* and 454*b* is moved, the first tooth-missing gear 450 rotates in the direction of arrow A2 in FIG. 7C.

Then, the electric motor 41 idles based on the rotation of the first tooth-missing gear 450. At this time, as illustrated in FIG. 6E, when the closed circuit 67 (a circuit indicated by a thick line in FIG. 6E) including the electric motor 41 is formed in the electric circuit 6, the electric motor 41 generates an electromotive force based on its own idling.

The current generated by the electric motor 41 passes through the closed circuit 67 and returns to the electric motor 41. Then, a Lorentz force is generated in the electric motor 41 based on the current returned to the electric motor 41. The Lorentz force acts as a braking force on the electric motor 41. Note that the above-described current is converted into thermal energy by a resistor (not illustrated) provided in the closed circuit 67. Such a braking force also acts on the first tooth-missing gear 450 as a resistance force against the rotation of the first tooth-missing gear 450.

As described above, when the closed circuit 67 is formed in the electric circuit 6, the moving speed of the pair of cylinder coupling pins 454*a* and 454*b* in the first direction is reduced due to the braking force. As a result, the time required for the entry operation of the cylinder coupling mechanism 45 becomes long, and the work efficiency may be lowered.

Therefore, in the case of the present embodiment, the control unit 47 switches the switches 62 to 66 of the electric circuit 6 so that the closed circuit 67 is not formed in the electric circuit 6 in the entry operation of the cylinder coupling mechanism 45 (In other words, when the pair of cylinder coupling pins 454*a* and 454*b* returns). Therefore, in the entry operation of the cylinder coupling mechanism 45, when the electric motor 41 idles, no current flows through the electric motor 41. As a result, the generation of the above-described braking force can be suppressed in the entry operation of the cylinder coupling mechanism 45. As a result, the time required for the entry operation of the cylinder coupling mechanism 45 is shortened, and the work efficiency may be improved.

Note that the control unit 47 may set the state of the electric circuit 6 to the first release state in all processes from the start to the end of the entry operation of the cylinder coupling mechanism 45. However, the control unit 47 may bring the electric circuit 6 into the first release state from the start of the entry operation of the cylinder coupling mechanism 45 until the entry operation of the cylinder coupling mechanism 45 satisfies a predetermined condition.

Thereafter, the control unit 47 may set the state of the electric circuit 6 as illustrated in FIG. 6E (braking state) until the entry operation of the cylinder coupling mechanism 45 is ended after the predetermined condition is satisfied.

In the braking state of the electric circuit 6, the first switch 62 and the third switch 64 are in an OFF state. In the braking state of the electric circuit 6, the second switch 63 and the fourth switch 65 are in an ON state. In the braking state of the electric circuit 6, the fifth switch 66 may be in an ON state or an OFF state. The braking state of the electric circuit 6 means a state in which a closed circuit including the electric motor 41 is formed in the electric circuit 6.

The predetermined condition corresponds to, for example, a case where the moving distance of the pair of cylinder coupling pins 454*a* and 454*b* in the first direction in the axial direction is equal to or less than a predetermined distance. Therefore, the control unit 47 brings the electric circuit 6 into the first release state when the moving distance of the cylinder coupling pins 454*a* and 454*b* in the first direction in the axial direction is equal to or less than a predetermined distance from the start of the entry operation of the cylinder coupling mechanism 45. Thereafter, the control unit 47 sets the state of the electric circuit 6 as illustrated in FIG. 6E (braking state) from when the moving distance of the cylinder coupling pins 454*a* and 454*b* in the first direction in the axial direction exceeds a predetermined distance until the entry operation of the cylinder coupling mechanism 45 is ended.

As described above, in the braking state of the electric circuit 6, the braking force acts on the first tooth-missing gear 450. As a result, the first tooth-missing gear 450 can be easily stopped at a desired position (reference position).

<Second Release State>

The second release state of the electric circuit 6 corresponds to an example of the third state of the electric circuit 6, and is a state (non-driving state) in which no current flows through the electric motor 41 as illustrated in FIG. 6D.

In the second release state of the electric circuit 6, the second switch 63 and the third switch 64 are in an ON state. Further, in the second release state of the electric circuit 6, the first switch 62, the fourth switch 65, and the fifth switch 66 are in an OFF state. That is, in the second release state of the electric circuit 6, the fourth switch 65 provided in the closed circuit 67 (the circuit indicated by the thick line in FIG. 6E) including the electric motor 41 is opened (turned into the OFF state).

The control unit 47 switches the electric circuit 6 to the second release state when the boom coupling mechanism 46 makes a state transition (the entry operation of the boom coupling mechanism 46) from the retracted state to the extended state. In other words, when the boom coupling pin (For example, the pair of boom coupling pins 144*a*) is moved by the biasing force received from the second biasing mechanism 463, the control unit 47 switches the electric circuit 6 to the second release state. Note that the instruction for causing the entry operation of the boom coupling mechanism 46 may be, for example, an instruction based on an operation input from an operator or an instruction based on a program incorporated in advance in the control unit 47.

In the second release state of the electric circuit 6, a closed circuit including the electric motor 41 is not formed in the electric circuit 6. Hereinafter, the reason for adopting such a configuration will be described.

In the entry operation of the boom coupling mechanism 46, when the electric circuit 6 is in the second release state and the brake mechanism 42 is in the release state, the pair of boom coupling pins (for example, the pair of boom coupling pins 144*a*) is moved in the first direction in the axial direction based on the biasing force of the second biasing mechanism 463. Then, as the boom coupling pin is moved, the second tooth-missing gear 460 rotates in the direction of arrow A1 in FIG. 8C.

Then, the electric motor 41 idles based on the rotation of the second tooth-missing gear 460. At this time, when the closed circuit 67 (refer to FIG. 6E) is formed in the electric circuit 6 for the same reason as described in the first release state of the electric circuit 6, the moving speed of the boom coupling pin in the first direction is reduced due to the braking force.

Therefore, in the case of the present embodiment, the control unit 47 switches the switches 62 to 66 of the electric circuit 6 so that the closed circuit 67 is not formed in the electric circuit 6 in the entry operation of the boom coupling mechanism 46 (In other words, when the pair of boom coupling pins 144*a* returns). Therefore, in the entry operation of the boom coupling mechanism 46, when the electric motor 41 idles, no current flows through the electric motor 41. As a result, the generation of the above-described braking force can be suppressed in the entry operation of the boom coupling mechanism 46. As a result, the time required for the entry operation of the boom coupling mechanism 46 is shortened, and the work efficiency may be improved.

Note that the control unit 47 may set the state of the electric circuit 6 to the second release state in all processes from the start to the end of the entry operation of the boom coupling mechanism 46. However, the control unit 47 may bring the electric circuit 6 into the second release state from the start of the entry operation of the boom coupling mechanism 46 until the entry operation of the boom coupling mechanism 46 satisfies a predetermined condition. Thereafter, the control unit 47 may set the state of the electric circuit 6 to the braking state as illustrated in FIG. 6E until the entry operation of the boom coupling mechanism 46 is ended after the predetermined condition is satisfied.

As described above, in the braking state of the electric circuit 6, the above-described braking force acts on the second tooth-missing gear 460. As a result, the second tooth-missing gear 460 can be easily stopped at a desired position (reference position).

<Operation of Coupling Mechanism>

Hereinafter, an example of the operations of the above-described cylinder coupling mechanism 45 and the boom coupling mechanism 46 will be briefly described.

<Operation of Cylinder Coupling Mechanism>

First, an example of the operation of the cylinder coupling mechanism 45 will be described with reference to FIGS. 2A to 2E and FIGS. 7A to 7C.

Figure 7B:
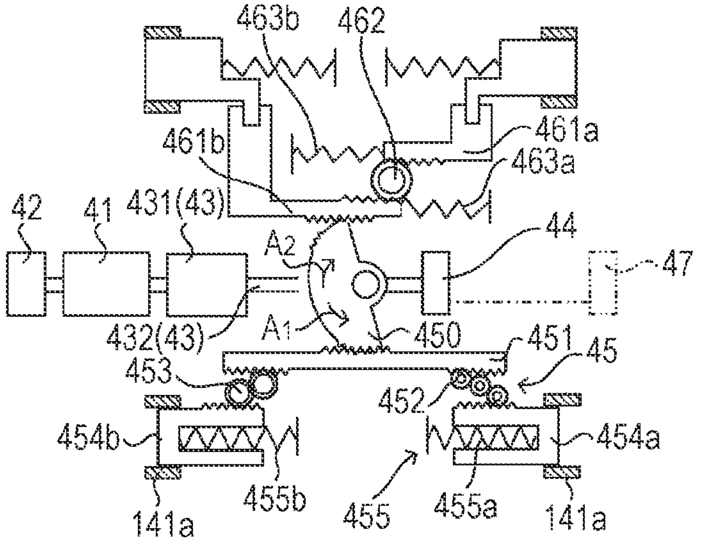
FIG. 7B is a schematic view for describing the operation of the cylinder coupling mechanism.

FIG. 7A is a schematic view illustrating the extended state of the cylinder coupling mechanism 45 and the engaged state between the pair of cylinder coupling pins 454*a* and 454*b* and the pair of cylinder pin receiving portions 141*a* of the distal end boom 141. FIG. 7B is a schematic view illustrating a state in the middle of transition from the extended state to the retracted state of the cylinder coupling mechanism 45. Further, FIG. 7C is a schematic view illustrating the retracted state of the cylinder coupling mechanism 45 and the disengaged state between the pair of cylinder coupling pins 454*a* and 454*b* and the pair of cylinder pin receiving portions 141*a* of the distal end boom 141.

The extended state of the cylinder coupling mechanism 45 illustrated in FIG. 7A corresponds to the state of the cylinder coupling mechanism 45 in FIGS. 2A to 2D. The state of the cylinder coupling mechanism 45 illustrated in FIG. 7B corresponds to a state in the middle of transition from the state of the cylinder coupling mechanism 45 illustrated in FIG. 2D to the state of the cylinder coupling mechanism 45 illustrated in FIG. 2E. The retracted state of the cylinder coupling mechanism 45 illustrated in FIG. 7C corresponds to the state of the cylinder coupling mechanism 45 illustrated in FIG. 2E.

The cylinder coupling mechanism 45 transitions from the extended state (refer to FIGS. 3, 4, and 7A) to the retracted state (refer to FIGS. 5 and 7C) based on the power of the electric motor 41. In addition, the cylinder coupling mechanism 45 transitions from the retracted state (refer to FIGS. 5 and 7C) to the extended state (refer to FIGS. 3, 4, and 7A) based on the biasing force of the first biasing mechanism 455.

Figure 7C:
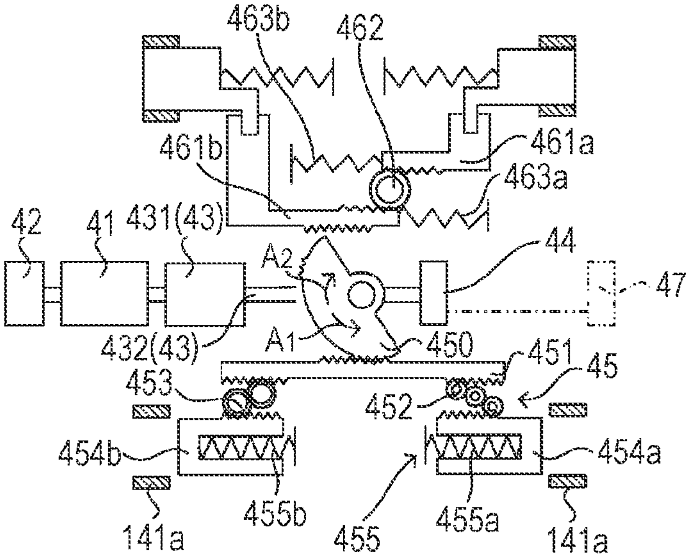
FIG. 7C is a schematic view for describing the operation of the cylinder coupling mechanism.

Note that, in FIGS. 7A to 7C, the first tooth-missing gear 450 and the second tooth-missing gear 460 are schematically illustrated as an integrated tooth-missing gear. Hereinafter, for convenience of description, this integrated tooth-missing gear will be described as the first tooth-missing gear 450. The position of the first tooth-missing gear 450 illustrated in FIG. 7A is defined as a reference position of the first tooth-missing gear 450.

When the cylinder coupling mechanism 45 transitions from the extended state to the retracted state, the control unit 47 switches the electric circuit 6 to the first driving state (refer to FIG. 6A). Power of the electric motor 41 is transmitted to the pair of cylinder coupling pins 454*a* and 454*b* via a first path and a second path below.

The first path is a path from the first tooth-missing gear 450 to the first rack bar 451, then to the first gear mechanism 452, and then to the one cylinder coupling pin 454*a*.

The second path is a path from the first tooth-missing gear 450 to the first rack bar 451, then to the second gear mechanism 453, and then to the other cylinder coupling pin 454*b*.

Specifically, first, in the first path and the second path, the first tooth-missing gear 450 rotates in the first direction (direction indicated by arrow A1 in FIG. 7A) in the rotation direction of the first tooth-missing gear 450 based on the power of the electric motor 41.

In the first path, when the first tooth-missing gear 450 rotates in the first direction, the first rack bar 451 is moved to the Y-direction positive side (the right side in FIGS. 7A to 7C) according to the rotation.

Then, in the first path, when the first rack bar 451 is moved to the Y-direction positive side, the one cylinder coupling pin 454*a* is moved to the Y-direction negative side (left side in FIGS. 7A to 7C) via the first gear mechanism 452. The Y-direction negative side corresponds to the second direction in the axial direction of one cylinder coupling pin 454*a*.

On the other hand, in the second path, when the first rack bar 451 is moved to the Y-direction positive side, the other cylinder coupling pin 454*b* is moved to the Y-direction positive side via the second gear mechanism 453. The Y-direction positive side corresponds to the second direction in the axial direction of the other cylinder coupling pin 454*b*.

The position information detection device 44 detects that the pair of cylinder coupling pins 454*a* and 454*b* disengage from the pair of cylinder pin receiving portions 141*a* of the distal end boom 141 to be moved to a predetermined position (for example, position illustrated in FIGS. 2E and 7C). Then, the control unit 47 stops the operation of the electric motor 41 based on the detection result.

Further, the transition of the cylinder coupling mechanism 45 from the retracted state to the extended state is automatically performed based on the biasing force of the first biasing mechanism 455 when the brake mechanism 42 is released in the non-energized state of the electric motor 41.

When the cylinder coupling mechanism 45 transitions from the retracted state to the extended state, the control unit 47 switches the electric circuit 6 to the first released state (refer to FIG. 6C). In the first release state of the electric circuit 6, a closed circuit including the electric motor 41 is not formed in the electric circuit 6. As a result, as described above, the time required for the entry operation of the cylinder coupling mechanism 45 is shortened, and the work efficiency may be improved.

<Operation of Boom Coupling Mechanism>

First, an example of the operation of the above-described boom coupling mechanism 46 will be described with reference to FIGS. 2A to 2E and FIGS. 8A to 8C.

Figure 8B:
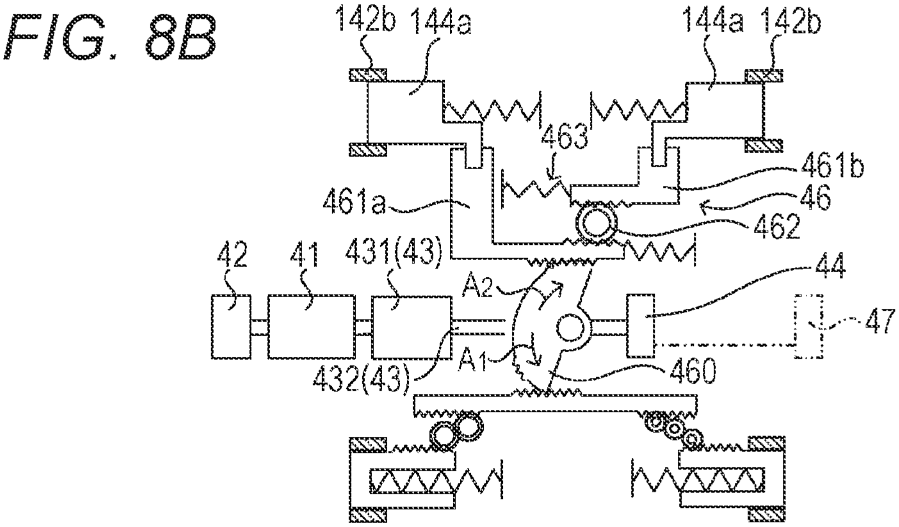
FIG. 8B is a schematic view for describing the operation of the boom coupling mechanism.

FIG. 8A is a schematic view illustrating the extended state of the boom coupling mechanism 46 and the engaged state between the pair of boom coupling pins 144*a* and the pair of first boom pin receiving portions 142*b* of the intermediate boom 142. FIG. 8B is a schematic view illustrating a state in the middle of transition from the extended state to the retracted state of the boom coupling mechanism 46. Further, FIG. 8C is a schematic view illustrating the retracted state of the boom coupling mechanism 46 and the disengaged state between the pair of boom coupling pins 144*a* and the pair of first boom pin receiving portions 142*b* of the intermediate boom 142.

The extended state of the boom coupling mechanism 46 illustrated in FIG. 8A corresponds to the state of the boom coupling mechanism 46 in FIG. 2A. The state of the boom coupling mechanism 46 illustrated in FIG. 8B corresponds to a state in the middle of transition from the state of the boom coupling mechanism 46 illustrated in FIG. 2A to the state of the boom coupling mechanism 46 illustrated in FIG. 2B. The retracted state of the boom coupling mechanism 46 illustrated in FIG. 8C corresponds to the state of the boom coupling mechanism 46 illustrated in FIG. 2B.

The boom coupling mechanism 46 transitions between an extended state (refer to FIG. 8A) and a retracted state (refer to FIG. 8C) based on the power of the electric motor 41.

Figure 8C:
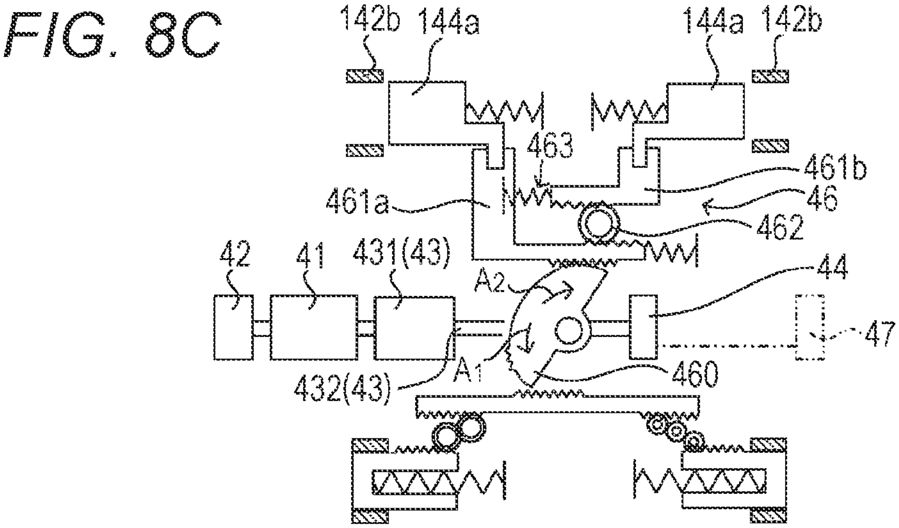
FIG. 8C is a schematic view for describing the operation of the boom coupling mechanism.

In FIGS. 8A to 8C, the first tooth-missing gear 450 and the second tooth-missing gear 460 are schematically illustrated as an integrated tooth-missing gear. Hereinafter, for convenience of description, this integrated tooth-missing gear will be described as the second tooth-missing gear 460. The position of the second tooth-missing gear 460 illustrated in FIG. 8A is defined as a reference position of the second tooth-missing gear 460.

When the boom coupling mechanism 46 transitions from the extended state to the retracted state, the control unit 47 switches the electric circuit 6 to the second driving state (refer to FIG. 6B). The power of the electric motor 41 is transmitted through the path of the second tooth-missing gear 460→the one second rack bar 461*a*→the synchronous gear 462→the other second rack bar 461*b*.

First, in the above-described path, the second tooth-missing gear 460 rotates in the first direction (the direction indicated by the arrow A2 in FIGS. 3 and 8A to 8C) in the rotation direction of the second tooth-missing gear 460 based on the power of the electric motor 41.

When the second tooth-missing gear 460 rotates in the first direction, the one second rack bar 461*a* is moved to the Y-direction positive side (the right side in FIGS. 8A to 8C) according to the rotation.

Then, the synchronous gear 462 rotates according to the movement of the one second rack bar 461*a* to the Y-direction positive side. Then, the other second rack bar 461*b* is moved to the Y-direction negative side (left side in FIGS. 8A to 8C) according to the rotation of the synchronous gear 462.

In a state where the pair of second rack bars 461*a* and 461*b* are engaged with the pair of boom coupling pins 144*a*, when the state transitions from the extended state to the retracted state, the pair of boom coupling pins 144*a* disengage from the pair of first boom pin receiving portions 142*b* of the intermediate boom 142 (refer to FIG. 8C).

The position information detection device 44 detects that the pair of boom coupling pins 144*a* disengage from the pair of first boom pin receiving portions 142*b* of the intermediate boom 142 to be moved to a predetermined position (for example, position illustrated in FIGS. 2B and 8C). Then, the control unit 47 stops the operation of the electric motor 41 based on the detection result.

As described above, in the present embodiment, the removal operation of the cylinder coupling mechanism 45 and the removal operation of the boom coupling mechanism 46 are prevented from being simultaneously performed.

Specifically, when the first tooth portion of the first tooth-missing gear 450 in the cylinder coupling mechanism 45 meshes with the first rack tooth portion of the first rack bar 451, the second tooth portion of the second tooth-missing gear 460 in the boom coupling mechanism 46 is configured not to mesh with the driving rack tooth portion of the one second rack bar 461*a*.

Conversely, when the second tooth portion of the second tooth-missing gear 460 in the boom coupling mechanism 46 meshes with the driving rack tooth portion of one of the second rack bars 461*a*, the first tooth portion of the first tooth-missing gear 450 in the cylinder coupling mechanism 45 does not mesh with the first rack tooth portion of the first rack bar 451.

Note that the entry operation of the boom coupling mechanism 46 is automatically performed based on the biasing force of the second biasing mechanism 463 when the brake mechanism 42 is released in the non-energized state of the electric motor 41. During this state transition, the pair of boom coupling pins 144*a* moves away from each other.

The position information detection device 44 detects that the pair of boom coupling pins 144*a* engage with the pair of first boom pin receiving portions 142*b* of the intermediate boom 142 to be moved to a predetermined position (for example, position illustrated in FIGS. 2A and 8A). The detection result is used to control a subsequent operation of the actuator 2.

When the boom coupling mechanism 46 transitions from the retracted state to the extended state, the control unit 47 switches the electric circuit 6 to the second release state (refer to FIG. 6D). In the second release state of the electric circuit 6, a closed circuit including the electric motor 41 is not formed in the electric circuit 6. As a result, as described above, the time required for the entry operation of the boom coupling mechanism 46 is shortened, and the work efficiency may be improved.

Effects of Present Embodiment

In the mobile crane 1 of the present embodiment having the above configuration, as described above, the time required for the entry operation of the cylinder coupling mechanism 45 and the entry operation of the boom coupling mechanism 46 can be shortened. As a result, the work efficiency of the extension/retraction work of the telescopic boom 14 can be improved.

APPENDIX

The work machine according to the present invention includes:

a plurality of booms that extend and retract with power of an actuator;

a first pin that is moved by a first spring to connect adjacent booms, and is moved by power of a motor to release the connection;

a second pin that is moved by the second spring to connect the boom and the actuator, and is moved by power of the motor to release the connection.

The technical idea disclosed in the specification and the drawings includes an invention obtained by arbitrarily combining various configurations described in the above-described embodiments. In particular, the technical idea disclosed in the specification and the drawings includes an invention obtained by applying various configurations disclosed in the specification and the drawings to the basic configuration in any combination.

This application is based upon and claims the benefit of priority from Japanese Patent Application No. 2021-164917, filed on Oct. 6, 2021, the entire contents of which are incorporated herein by reference.

INDUSTRIAL APPLICABILITY

The crane according to the present invention is not limited to a rough terrain crane and may be various mobile cranes such as an all-terrain crane, a truck crane, and a loading truck crane (also referred to as a cargo crane). In addition, the crane according to the present invention is not limited to a mobile crane and may be other cranes including a telescopic boom.

REFERENCE SIGNS LIST

1 MOBILE CRANE
10 TRAVELING BODY
101 WHEEL
11 OUTRIGGER
12 TURNING TABLE
14 TELESCOPIC BOOM
141 DISTAL END BOOM
141*a* CYLINDER PIN RECEIVING PORTION
141*b* BOOM PIN RECEIVING PORTION
142 INTERMEDIATE BOOM
142*a* CYLINDER PIN RECEIVING PORTION
142*b* FIRST BOOM PIN RECEIVING PORTION
142*c* SECOND BOOM PIN RECEIVING PORTION
142*d* THIRD BOOM PIN RECEIVING PORTION
143 PROXIMAL END BOOM
144*a*, 144*b* BOOM COUPLING PIN

144*c* PIN-SIDE RECEIVING PORTION
15 RAISING AND LOWERING CYLINDER
16 WIRE ROPE
17 HOOK
2 ACTUATOR
3 EXTENSION/RETRACTION CYLINDER
31 ROD MEMBER
32 CYLINDER MEMBER
4 PIN MOVEMENT MODULE
41 ELECTRIC MOTOR
42 BRAKE MECHANISM
43 TRANSMISSION MECHANISM
431 SPEED REDUCER
432 TRANSMISSION SHAFT
44 POSITION INFORMATION DETECTION DEVICE
45 CYLINDER COUPLING MECHANISM
450 FIRST TOOTH-MISSING GEAR
451 FIRST RACK BAR
451*a* FIRST RACK TOOTH PORTION
451*b* SECOND RACK TOOTH PORTION
451*c* THIRD RACK TOOTH PORTION
452 FIRST GEAR MECHANISM
453 SECOND GEAR MECHANISM
454*a*, 454*b* CYLINDER COUPLING PIN
455 FIRST BIASING MECHANISM
455*a*, 455*b* COIL SPRING
46 BOOM COUPLING MECHANISM
460 SECOND TOOTH-MISSING GEAR
461*a*, 461*b* SECOND RACK BAR
461*c* DRIVING RACK TOOTH PORTION
461*g*, 461*h* LOCKING CLAW PORTION
462 SYNCHRONOUS GEAR
463 SECOND BIASING MECHANISM
463*a*, 463*b* COIL SPRING
47 CONTROL UNIT
6 ELECTRIC CIRCUIT
61 POWER SUPPLY DEVICE
62 FIRST SWITCH
63 SECOND SWITCH
64 THIRD SWITCH
65 FOURTH SWITCH
66 FIFTH SWITCH
67 CLOSED CIRCUIT
681 FIRST RELAY CIRCUIT
682 SECOND RELAY CIRCUIT
683 THIRD RELAY CIRCUIT
6L1 FIRST LINE
6L2 SECOND LINE
6L3 THIRD LINE
6L4 FOURTH LINE

The invention claimed is:

1. A work machine, comprising:

a plurality of booms that extend and retract by power of an actuator;

a first pin that is moved by a first spring to connect adjacent booms, and is moved by power of a motor to release a connection of the adjacent booms;

a second pin that is moved by a second spring to connect the boom and the actuator, and is moved by power of the motor to release a connection of the boom and the actuator; and a circuit that is configured so that when the first pin is moved by the first spring or the second pin is moved by the second spring, no current flows through the motor when the motor idles due to the movement of the first pin or the second pin.

2. The work machine according to claim 1, further comprising a control unit that opens a closed circuit to be formed to include the motor, by opening at least one switch provided in the circuit when the first pin is moved by the first spring or when the second pin is moved by the second spring.

3. The work machine according to claim 2, wherein the control unit opens a switch provided in the closed circuit to be formed, when the first pin is moved by the first spring or when the second pin is moved by the second spring.

4. The work machine according to claim 1, wherein the motor includes one motor, and is driven when the first pin is moved and when the second pin is moved, and stops when the first pin is moved by the first spring and when the second pin is moved by the second spring.

5. The work machine according to claim 4, wherein a rotation direction of the motor is switched based on switching of at least one switch provided in the circuit.

6. The work machine according to claim 5, wherein the circuit includes any of:

a first state in which the motor rotates in a first direction and the first pin is driven;

a second state in which the motor rotates in a second direction and the second pin is driven; and a third state in which the motor is stopped and the closed circuit including the motor is not formed in the circuit.

* * * * *